United States Patent [19]
Sakasegawa et al.

[11] 3,838,578
[45] Oct. 1, 1974

[54] AIR CONDITIONING SYSTEM

[75] Inventors: Hiroshi Sakasegawa; Kuniyuki Tanabe, both of Yokohama, Japan

[73] Assignee: Nissan Motor Company, Limited, Yokohama City, Japan

[22] Filed: June 26, 1973

[21] Appl. No.: 373,809

[30] Foreign Application Priority Data
June 28, 1972  Japan.............................. 47-76443

[52] U.S. Cl......................... 62/125, 62/129, 62/474
[51] Int. Cl............................................ F25b 49/00
[58] Field of Search ................ 62/125, 129; 73/356; 116/114 V, DIG. 14; 165/11

[56] References Cited
UNITED STATES PATENTS

| | | | |
|---|---|---|---|
| 1,677,208 | 7/1928 | Rohrer............................ | 116/114 V |
| 2,106,756 | 2/1938 | Obermaier........................ | 62/129 X |
| 2,889,799 | 6/1959 | Korpman.......................... | 116/114 V |
| 3,212,289 | 10/1965 | Bottum............................ | 62/509 X |
| 3,491,544 | 1/1970 | Webber............................ | 62/129 X |
| 3,620,889 | 11/1971 | Baltzer............................ | 73/356 X |
| 3,651,695 | 3/1972 | Brown............................. | 116/114 V |
| 3,696,675 | 10/1972 | Gilmour.......................... | 116/114 V X |

Primary Examiner—William F. O'Dea
Assistant Examiner—Peter D. Ferguson

[57] ABSTRACT

Thermochromic materials disposed at various locations in an air conditioning system which change color in response to abnormal operating conditions.

1 Claim, 3 Drawing Figures

3,838,578

AIR CONDITIONING SYSTEM

This invention relates in general to air conditioning systems and more particularly to an air conditioning system for use in an automobile, bus or truck for maintaining the occupants therein comfortable.

A conventional air conditioning system used in a wheeled vehicle usually has a closed refrigerant compressor, which pumps refrigerant respectively through a condenser, receiver-dehydrator, expansion valve, and evaporator. The elements of the system are interconnected by suitable conduits, including one which returns refrigerant from the outlet of the evaporator to the refrigerant compressor. With this arrangement, however, a drawback is encountered in that an abnormal phenomenon such as a flow restriction caused by clogging or chork-up may choke-up in the closed circuit, especially in a receiver-dehydrator of a type employing a dehydrating agent which filters the refrigerant. When this takes place, there is a temperature difference between the inlet and outlet of the receiver-dehydrator. It has heretofore been proposed to have the refrigerant conduits equipped with thermistors, thermocouples or thermometers to measure the temperatures at the outer surfaces of the refrigerant lines. These temperature detectors, however, cannot be readily installed on the outer surfaces of the closed system at suitable locations thereof.

It is, therefore, an object of the present invention to provide an improved air conditioning system which overcomes the drawbacks hereinbefore mentioned.

Another object of the present invention is to provide a device for detecting an abnormal temperature variation in an air conditioning system.

Another object of the present invention is to provide a device for detecting abnormal temperature variations between conduits in a closed fluid circuit of an air conditioning system.

Still another object of the present invention is to provide a device for detecting temperature variations in a closed fluid circuit of an air conditioning system.

A further object of the present invention is to provide a device for detecting an abnormal phenomenon such as a flow restriction caused by clogging or chokeup in a closed fluid circuit of an air conditioning system.

A further object of the present invention is to provide a device for detecting temperature variations caused by flow restriction in a closed fluid circuit of an air conditioning system.

A still further object of the present invention is to provide a device for detecting an abnormal phenomenon in a closed fluid circuit of an air conditioning system which is simple in construction, and can readily be installed on an outer surface of a component a closed fluid circuit.

These and other features and advantages of the present invention will become more apparent from the following description when taken in conjunction with the accompanying drawings, in which.

Figure 1:
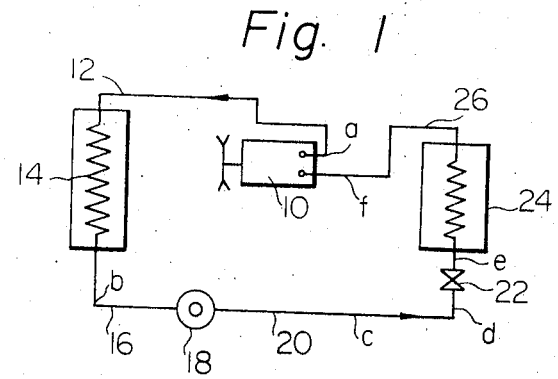
FIG. 1 is a schematic view of an air conditioning system to which the present invention is directed.
Figure 3:
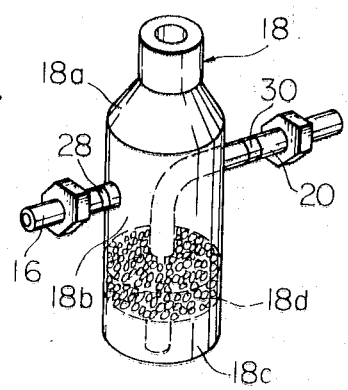
FIG. 3 is a perspective enlarged view of a receiver-dehydrator incorporating a device according to the present invention.

Referring now to FIG. 1, there is shown an air conditioning system to which the present invention is directed. As shown, the air conditioning system comprises, as customary, a refrigerant compressor 10 which may be connected to and driven by a suitable prime mover (not shown) such as a vehicle engine. The refrigerant compressor 10 is connected through a suitable refrigerant line 12 to a condenser 14 and delivers hot compressed refrigerant gas thereto. The condensor 14 serves to condense the compressed refrigerant gas by cooling it from a relatively high to a relatively low temperature. The condenser 14 is connected through a line 16 to a receiver-dehydrator 18 to feed condensed liquid refrigerant thereinto. The receiver-dehydrator 18 in turn is connected through a refrigerant line 20 to a refrigerant expansion valve 2 22. As seen in FIG. 3, the receiver-dehydrator 18 includes a casing 18a, which has first and second chambers 18b and 18c separated by a dehydrating agent 18d located in the casing 18a. The refrigerant line 16 communicates with the first chamber 18b, whereas the refrigerant line 20 communicates with the second chamber 18c of the casing 18a. This refrigerant line 20 is connected to the expansion valve 22, which in turn is connected to an evaporator 24. The expansion valve 22 serves to meter refrigerant fluid being fed into the evaporator 24. The evaporator 24 and the refrigerant compressor 10 are interconnected by a suitable refrigerant line 26 to form a closed circuit.

Figure 2:
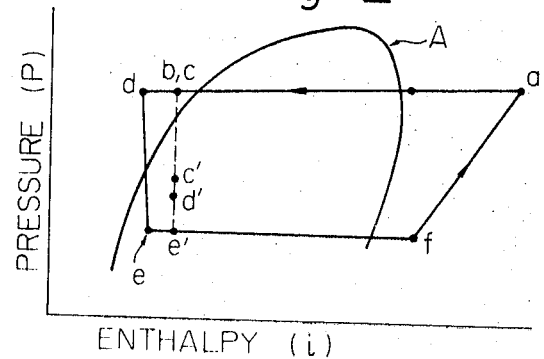
FIG. 2 is a diagram showing the pressure-enthalpy relationship of a refrigerant used in the air conditioning system shown in FIG. 1.

FIG. 2 illustrates the enthalpy v.s. pressure relationship of a refrigerant which may be used in the air conditioning system of FIG. 1. Characters $a, b, c, d, e$, and $f$ in FIG. 2 correspond to the state of the refrigerant fluid at points designated by these some characters in FIG. 2. In FIG. 2, a curve A represents the saturated vapor line. The point $a$ is representative of the state of the refrigerant as it is discharged from the refrigerant compressor 10. A line $a-d$ represents delivery of refrigerant through the condenser 14 and receiver-dehydrator 18 into the expansion valve 22. A line $d-e$ indicates expansion of the refrigerant after passing through the expansion valve 22. A line $e-f$ indicates vaporization of the refrigerant in the evaporator 24, during which time the useful work of cooling the vehicle passenger compartment is performed. A line $f-a$ represents return of the refrigerant from the evaporator 24 to the compressor 10. From this, it will be noted that the air conditioning system of FIG. 1 has an operating cycle including compression, condensation, expansion, and vaporization.

With the configuration described hereinabove, if an abnormal phenomenon such as a flow restriction due to clogging or choke-up takes place at a particular location, for example, in the receiver-dehydrator 18 of the closed circuit, the cycle of FIG. 2 is altered in a manner shown as $a-b-c'-d'-e'-f$, causing temperature abnormalities in the circuit.

The present invention contemplates to provide temperature sensitive means such as thermo-sensitive tapes 28 and 30 on the refrigerant lines 16 and 20 at positions upstream and downstream of the receiver-dehydrator 18, respectively. Each of these tapes 28 and 30 is coated with a temperature sensitive thermochromic material such as thermoink so that the color of the tape changes in response to temperature variations and, therefore, the operator can readily note abnormal phenomenon in the air conditioning system, especially in the receiver-dehydrator 18. Examples of thermochromic materials which may be used are clearly disclosed in U.S. Pat. No. 3,511,086 entitled "Nondestructive Testing with Liquid Crystals". In the event that thermoink is employed as the thermochromic material, it is desirable that the thermoink change its color completely from, for example, white to red when the temperature changes from one given temperature to another given temperature. This given temperature is intended to correspond to a particular temperature at which an abnormal phenomenon occurs in the receiver-dehydrator 18. If the tapes 28 and 30 originally have a red color, then the color will change to white when an abnormal phenomenon takes place in the receiver-dehydrator 18. Thus, the operator will be able to find an abnormal phenomenon in the air conditioning system merely by checking the color of the tapes 28 and 30 on the lines 16 and 20, respectively.

It will be understood that a liquid crystal may also be used as the thermochromic material and coated on the tapes to detect temperature variations. The liquid crystal will alter its color continuously and, hence, it is required that a color representing an abnormal condition in the receiver-dehydrator be determined in advance.

While, in the preferred embodiment of the present invention, tapes have been described as being applied to detect an abnormal condition in the receiver-dehydrator, tapes can be applied to other parts of the air conditioning system for detecting abnormal conditions therein.

It will now be appreciated from the foregoing description that the present invention offers the advantage of ease of detection of abnormal phenomenon in an air conditioning system by simple means.

What is claimed is:

1. An air conditioning system comprising a refrigerant compressor, a condenser connected to said refrigerant compressor, a first conduit connected to said condenser, a receiver-dehydrator connected to said condenser through said first conduit, a second conduit connected to said receiver-dehydrator, an expansion valve connected to said receiver-dehydrator through said second conduit, said receiver-dehydrator containing a dehydrating agent to form therein first and second chambers separated by the dehydrating agent, said first conduit communicating with said first chamber of said receiver-dehydrator, said second conduit communicating with said second chamber of said receiver-dehydrator, an evaporator connected to said expansion valve and to said refrigerant compressor, and temperature-sensitive tapes provided on said first and second conduits at positions upstream and downstream of said receiver-dehydrator for detecting abnormal temperature variations therein.

* * * * *